(12) United States Patent
Yeom et al.

(10) Patent No.: US 11,899,866 B2
(45) Date of Patent: Feb. 13, 2024

(54) DISPLAY DEVICE

(71) Applicant: Samsung Display Co., Ltd., Yongin-Si (KR)

(72) Inventors: Jisu Yeom, Asan-si (KR); Suyul Seo, Incheon (KR); Seongjun Lee, Seoul (KR); Dong-Hwan Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/471,493

(22) Filed: Sep. 10, 2021

(65) Prior Publication Data
US 2022/0206611 A1 Jun. 30, 2022

(30) Foreign Application Priority Data

Dec. 28, 2020 (KR) .................. 10-2020-0185156

(51) Int. Cl.
*G06F 3/041* (2006.01)
*G06F 3/044* (2006.01)
*G06V 40/13* (2022.01)

(52) U.S. Cl.
CPC .......... *G06F 3/0412* (2013.01); *G06F 3/0446* (2019.05); *G06F 3/0448* (2019.05); *G06F 3/04164* (2019.05); *G06F 3/04166* (2019.05); *G06V 40/1306* (2022.01)

(58) Field of Classification Search
CPC .. G06F 3/0412; G06F 3/04166; G06F 3/0446; G06F 3/04164; G06F 3/0448; G06V 40/1306

USPC ......................................................... 345/173
See application file for complete search history.

(56) References Cited

U.S. PATENT DOCUMENTS

| | | |
|---|---|---|
| 10,095,349 B2 | 10/2018 | Han et al. |
| 10,386,957 B2 | 8/2019 | Nakamura |
| 10,664,108 B2 | 5/2020 | Kim et al. |
| 2013/0135247 A1* | 5/2013 | Na .................. G06F 21/32 345/174 |
| 2014/0118301 A1* | 5/2014 | Cho .................. G06F 3/04166 345/174 |
| 2016/0364593 A1* | 12/2016 | Lee .................. G06F 3/0446 |
| 2018/0113558 A1* | 4/2018 | Cho .................. G06F 3/0446 |

FOREIGN PATENT DOCUMENTS

| | | |
|---|---|---|
| KR | 10-2013-0057637 | 6/2013 |
| KR | 10-2017-0131775 | 11/2017 |
| KR | 10-2017-0142409 | 12/2017 |
| KR | 10-1970083 | 4/2019 |

* cited by examiner

*Primary Examiner* — Mark Edwards
(74) *Attorney, Agent, or Firm* — F. CHAU & ASSOCIATES, LLC

(57) ABSTRACT

A display device includes a display panel, a plurality of first sensing electrodes disposed on the display panel, and a plurality of second sensing electrodes disposed on the first sensing electrodes and isolated from the first sensing electrodes. A wire width of each first sensing electrode of a second group is smaller than a wire width of each first sensing electrode of a first group, and a wire width of each second sensing electrode of a fourth group is smaller than a wire width of each second sensing electrode of a third group.

20 Claims, 11 Drawing Sheets

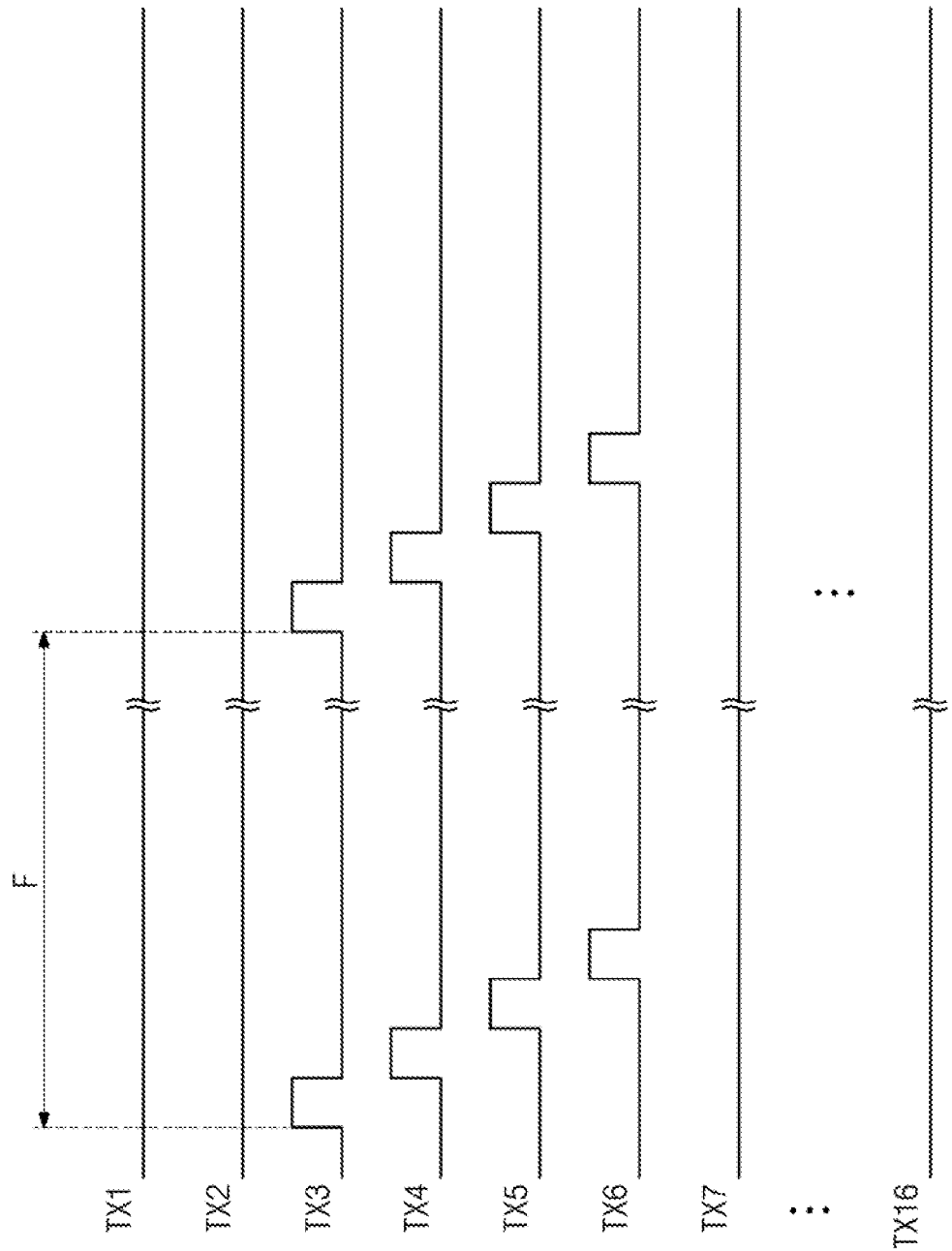

DISPLAY DEVICE

CROSS-REFERENCE TO RELATED APPLICATIONS

This application claims priority under 35 U.S.C. § 119 to Korean Patent Application No. 10-2020-0185156, filed on Dec. 28, 2020 in the Korean Intellectual Property Office, the disclosure of which is incorporated by reference herein in its entirety.

TECHNICAL FIELD

Embodiments of the inventive concept relate to a display device, and more particularly, to a display device including sensing electrodes.

DISCUSSION OF RELATED ART

Multimedia electronic devices such as televisions, mobile phones, tablet personal computers (PCs), computers, navigation devices, game consoles, and the like may include a display device which may display an image. In addition to a general input method such as a button, a keyboard, a mouse, or the like, an electronic device may include a display device capable of detecting a touch-based input which may allow a user to enter information or commands easily and intuitively.

A personal electronic device such as a mobile phone may detect not only a touch provided by a user's body but also an input provided by an electronic pen.

SUMMARY

Embodiments of the inventive concept provide a display device with improved sensitivity while sensing an input from various input means.

According to an embodiment, a display device includes a display panel, a plurality of first sensing electrodes disposed on the display panel, and a plurality of second sensing electrodes disposed on the first sensing electrodes and isolated from the first sensing electrodes. A wire width of each first sensing electrode of a second group is smaller than a wire width of each first sensing electrode of a first group, and a wire width of each second sensing electrode of a fourth group is smaller than a wire width of each second sensing electrode of a third group.

In an embodiment, the first sensing electrodes extend in a first direction, the second sensing electrodes extend in a second direction crossing the first direction, and an area in which the first sensing electrodes of the second group cross the second sensing electrodes of the fourth group is a fingerprint sensing area.

In an embodiment, the display device further includes a panel driving circuit driving the display panel and outputting a synchronization signal and a sensor controller transmitting or receiving a signal to or from the plurality of first sensing electrodes and the plurality of second sensing electrodes.

In an embodiment, the sensor controller sequentially provides transmit signals of an active level to the first sensing electrodes in a first sensing mode. Active periods of the transmit signals provided to the first sensing electrodes of the second group overlap each other.

In an embodiment, active periods of the transmit signals provided to the first sensing electrodes of the first group do not overlap the active periods of the transmit signals provided to the first sensing electrodes of the second group.

In an embodiment, the sensor controller sequentially provides transmit signals of an active level to the first sensing electrodes in a second sensing mode.

In an embodiment, the second sensing mode is a mode in which a user's fingerprint is detected.

In an embodiment, the display device further includes a base layer disposed on the display panel, a first conductive layer disposed on the base layer, a sensor insulating layer disposed on the first conductive layer, a base substrate, and a second conductive layer disposed under the base substrate. The first sensing electrodes are formed by the first conductive layer, and the second sensing electrodes are formed by the second conductive layer.

In an embodiment, the display device further includes an adhesive layer bonding the sensor insulating layer and the second conductive layer.

In an embodiment, the wire width of each of the first sensing electrodes of the second group is not greater than 80 micrometers (μm).

In an embodiment, the display panel includes a plurality of pixels connected to a plurality of scan lines and a plurality of data lines. The display panel also includes a scan driving circuit connected to the plurality of scan lines.

According to an embodiment, a display device includes a display panel, a base layer disposed on the display panel, a first conductive layer disposed on the base layer, a sensor insulating layer disposed on the first conductive layer, a base substrate, a second conductive layer disposed under the base substrate, and an adhesive layer bonding the sensor insulating layer and the second conductive layer. A plurality of first sensing electrodes are formed by the first conductive layer, and a plurality of second sensing electrodes are formed by the second conductive layer.

In an embodiment, a wire width of each first sensing electrode of a second group is smaller than a wire width of each first sensing electrode of a first group.

In an embodiment, a wire width of each second sensing electrode of a fourth group may be smaller than a wire width of each second sensing electrode of a third group.

In an embodiment, the first sensing electrodes extend in a first direction, the second sensing electrodes extend in a second direction crossing the first direction, and an area in which the first sensing electrodes of the second group cross the second sensing electrodes of the fourth group is a fingerprint sensing area.

In an embodiment, the display device further includes a panel driving circuit driving the display panel and outputting a synchronization signal and a sensor controller transmitting or receiving a signal to or from the first sensing electrodes and the second sensing electrodes.

In an embodiment, the sensor controller sequentially provides transmit signals of an active level to the first sensing electrodes in a first sensing mode. Active periods of the transmit signals provided to the first sensing electrodes of the second group may overlap each other.

In an embodiment, active periods of the transmit signals provided to the first sensing electrodes of the first group do not overlap the active periods of the transmit signals provided to the first sensing electrodes of the second group.

In an embodiment, the sensor controller sequentially provides transmit signals of an active level to the first sensing electrodes of the second group in a second sensing mode.

In an embodiment, the second sensing mode is a mode in which a user's fingerprint is detected.

BRIEF DESCRIPTION OF THE DRAWINGS

The above and other objects and features of the inventive concept will become apparent by describing in detail embodiments thereof with reference to the accompanying drawings, in which:

FIG. 12 is a timing diagram of an operation of an input sensor in a second operating mode.

DETAILED DESCRIPTION

Figure 1:
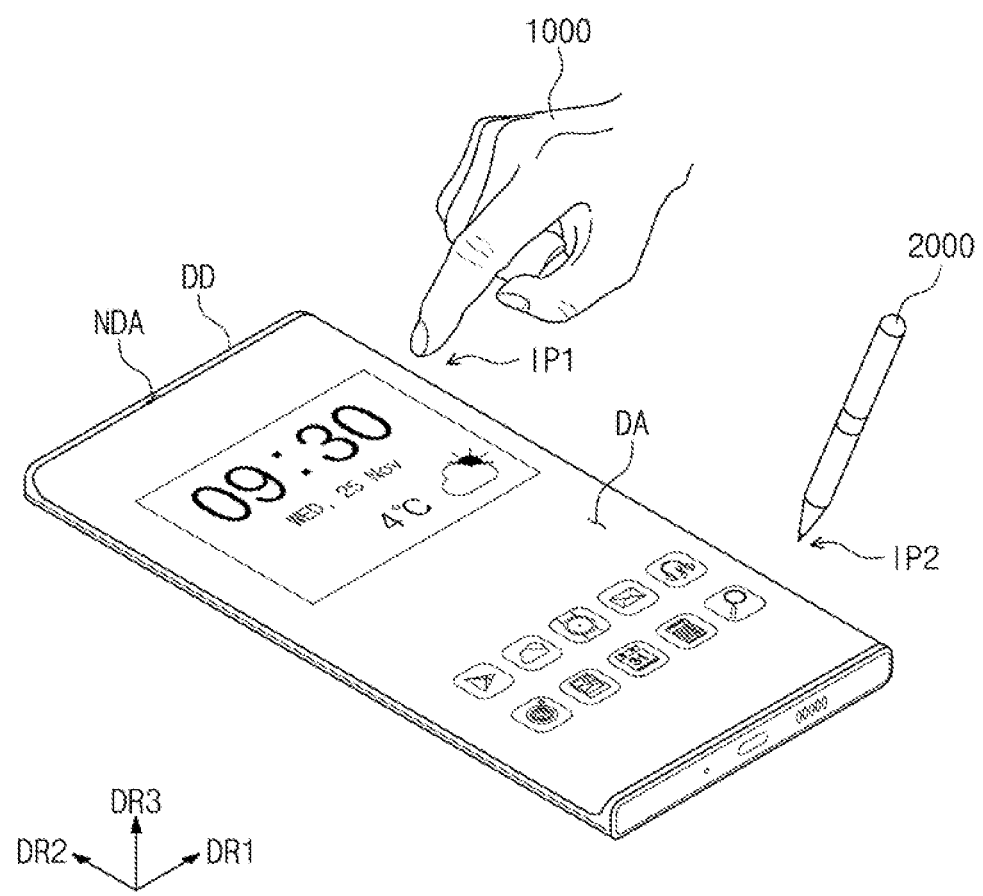
FIG. 1 is a perspective view of a display device according to an embodiment of the inventive concept.

Embodiments of the inventive concept will be described more fully hereinafter with reference to the accompanying drawings. Like reference numerals may refer to like elements throughout the accompanying drawings.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements should be interpreted in a like fashion.

It will be understood that although the terms "first", "second", etc. may be used herein to describe various elements, components, regions, layers, and/or sections, these elements, components, regions, layers, and/or sections should not be limited by these terms. The terms are only used to differentiate one element, component, region, layer, and/or section from another element, component, region, layer, and/or section. Thus, a first element, component, region, layer, and/or section discussed below may be termed a second element, component, region, layer, and/or section without departing from the spirit or scope of embodiments of the inventive concept.

Spatially relative terms, such as "under", "beneath", "on", "above", etc., may be used herein for ease of description to describe a relationship between components illustrated in the drawings. The terms are relative and are described with reference to a direction indicated in the drawing. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a", "an", and "the" are intended to include the plural forms as well, unless the context clearly indicates otherwise.

FIG. 1 is a perspective view of a display device DD according to an embodiment of the inventive concept.

Referring to FIG. 1, the display device DD may be a device which may be activated in response to an electrical signal. For example, the display device DD may be a mobile phone, a tablet PC, a car navigation system, a game console, or a wearable device, but is not limited thereto. FIG. 1 illustrates the display device DD as a mobile phone.

An active area DA and a peripheral area NDA may be provided in the display device DD. The display device DD may display an image through the active area DA. The active area DA may include a surface extending in a first direction DR1 and a second direction DR2. The peripheral area NDA may at least partially surround a periphery of the active area DA.

A thickness direction of the display device DD may be parallel to a third direction DR3 crossing the first direction DR1 and the second direction DR2. Accordingly, front surfaces (or upper surfaces) and bottom surfaces (or lower surfaces) of members constituting the display device DD may be termed as such based on the third direction DR3.

The display device DD may detect external inputs provided by input means. For example, the display device DD may detect a first input IP1 provided by a first input means 1000 and a second input IP2 provided by a second input means 2000. The first input means 1000 may include all input means which may provide a change in capacitance, such as a user's body or a passive pen. The second input means 2000 may be an active type of an input means which may provide a driving signal and may be, for example, an active pen (or an electronic pen).

The display device DD and the second input means 2000 may each communicate with each other. For example, the display device DD may provide an uplink signal to the second input means 2000, and the second input means 2000 may provide a downlink signal to the display device DD.

Figure 2:
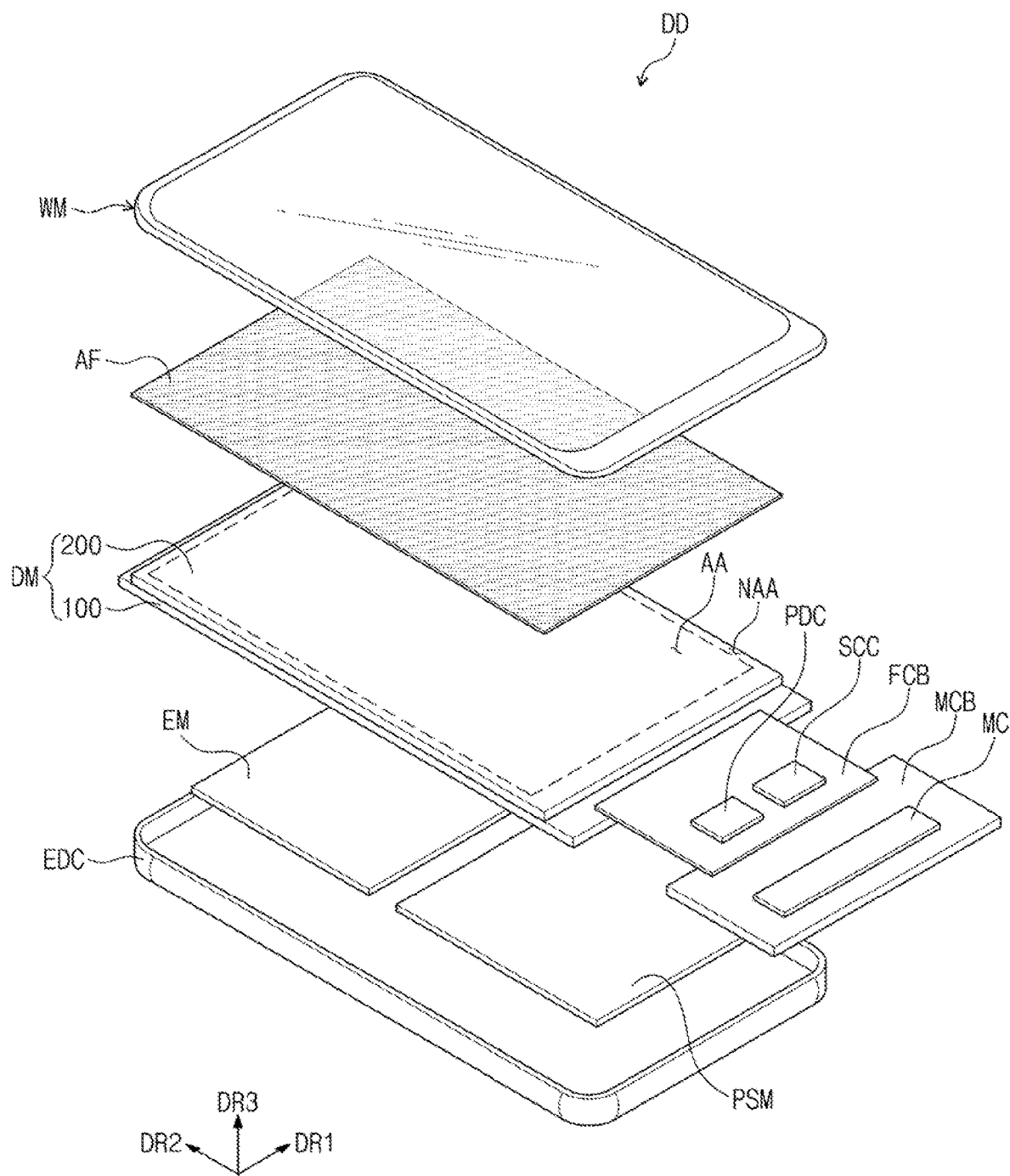
FIG. 2 is an exploded perspective view of a display device according to an embodiment of the inventive concept.

FIG. 2 is an exploded perspective view of the display device DD according to an embodiment of the inventive concept.

As illustrated in FIG. 2, the display device DD may include a display module DM, an optical member AF, a window WM, an electronic module EM, a power supply module PSM, and a case EDC.

The display module DM may generate an image and detect an external input. The display module DM may include a display panel 100 and an input sensor 200. The display module DM may include an active area AA and a peripheral area NAA respectively corresponding to the active area DA (refer to FIG. 1) and the peripheral area NDA (refer to FIG. 1) of the display device DD.

The display panel 100 may be a light emitting display panel, but is not particularly limited thereto. For example, the display panel 100 may be a light emitting display panel such as an organic light emitting display panel, a quantum dot light emitting display panel, or the like. A detailed description of the input sensor 200 will be described later.

The display module DM may include a main circuit board MCB, a flexible circuit film FCB, a panel driving circuit PDC, and a sensor controller SCC. In an embodiment, one or more thereof may be omitted. The main circuit board MCB may be connected to the flexible circuit film FCB and may be electrically connected to the display panel 100. The main circuit board MCB may include a plurality of driving elements. The plurality of driving elements may include a main controller MC that may drive the driving circuit PDC and the sensor controller SCC. The flexible circuit film FCB may be connected to the display panel 100 to electrically connect the display panel 100 to the main circuit board MCB. The panel driving circuit PDC and the sensor controller SCC may be mounted on the flexible circuit film FCB.

The flexible circuit film FCB may be bent such that the main circuit board MCB faces a bottom surface of the display device DD. The main circuit board MCB may be electrically connected to the electronic module EM via a connector.

The panel driving circuit PDC may be electrically connected to the display panel 100 and may control the display panel 100. The sensor controller SCC may be electrically connected to the input sensor 200 and may control the input sensor 200.

Each of the panel driving circuit PDC and the sensor controller SCC may be formed as an integrated circuit and may be mounted on the flexible circuit film FCB. In an embodiment, both the panel driving circuit PDC and the sensor controller SCC may be implemented as a single integrated circuit. The panel driving circuit PDC may be referred to as a "driving controller", a "timing controller", a "signal generating circuit", and the sensor controller SCC may be variously referred to as an "input driving circuit", a "sensor driving circuit", or a "touch driving circuit".

The input sensor 200 may be electrically connected to the main circuit board MCB through an additional flexible circuit film. However, embodiments of the inventive concept are not limited thereto. For example, the input sensor 200 may be electrically connected to the display panel 100, and may also be electrically connected to the main circuit board MCB through the flexible circuit film FCB.

The optical member AF may lower a reflectance of external light. The optical member AF may include a polarizer and a retarder. Each of the polarizer and the retarder may have a stretched optical film or a coated optical film. In a coated optical film, an optical axis is defined in a stretching direction of a functional film. A coated optical film may include liquid crystal molecules arranged on a base film.

In an embodiment of the inventive concept, the optical member AF may be omitted, and the display module DM may instead further include a black matrix and a color filter.

The window WM may provide an outer surface of the display device DD. The window WM may include a base substrate and may further include at least one functional layer, such as an anti-reflection layer and/or an anti-fingerprint layer.

The display device DD may further include at least one adhesive layer. The at least one adhesive layer may bond adjacent components of the display device DD. The at least one adhesive layer may be an optically-transparent adhesive layer, a pressure-sensitive adhesive layer, or the like.

The electronic module EM may include at least the main controller MC. The electronic module EM may include a wireless communication module, an image input module, a sound input module, a sound output module, a memory, an external interface module, and the like. The modules may be mounted on the circuit board or may be electrically connected through a flexible circuit board. The electronic module EM may be electrically connected to the power supply module PSM.

The main controller MC may control overall operations of the display device DD. The main controller MC may control operations of a wireless communication module, an image input module, a sound input module, and a sound output module, as well as the display module DM. The main controller MC may include at least one microprocessor.

The case EDC may be coupled to the window WM and may at least partially enclose components of the display device DD. The case EDC may protect the components enclosed in the case EDC by absorbing external shocks applied from outside the display device DD and reducing the penetration of foreign objects/moisture into the display device DD. In an embodiment of the inventive concept, the case EDC may include and/or be coupled to a plurality of storage members.

Figure 3:
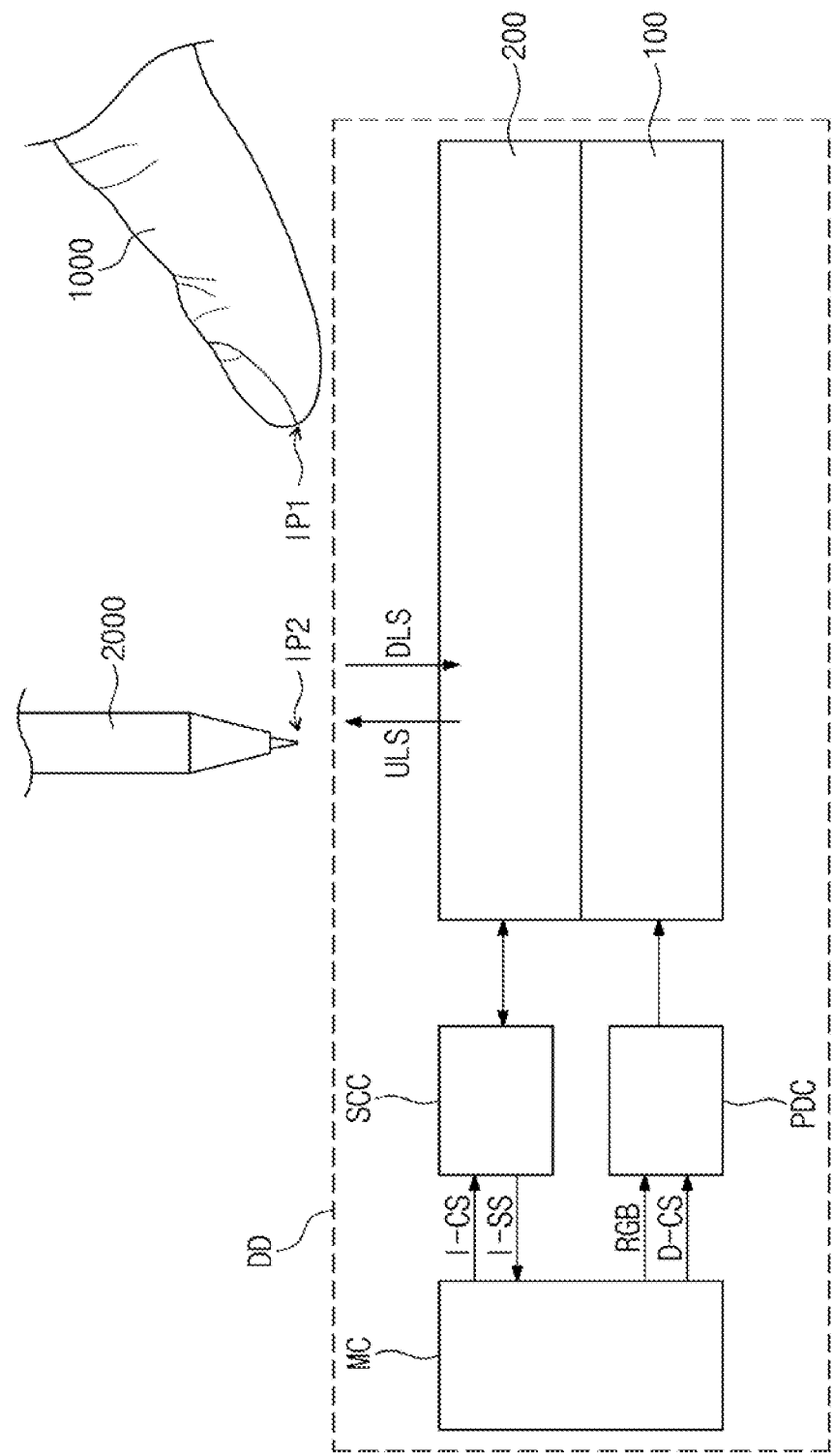
FIG. 3 illustrates an operation between a display device and input means according to an embodiment of the inventive concept.

FIG. 3 illustrates an operation between the display device DD and input means 1000 and 2000 according to an embodiment of the inventive concept.

Referring to FIG. 3, the display device DD may detect external inputs provided by input means. In an embodiment, the display device DD may detect the first input IP1 provided by the first input means 1000 and the second input IP2 provided by the second input means 2000.

The first input means 1000 may include all input means which may provide a change in capacitance, such as a user's body or a passive-type pen. The second input means 2000 may be an electronic pen which may provide a driving signal, such as an active-type pen and the like. For example, the second input means 2000 illustrated in FIG. 3 is an active-type-pen.

The display device DD and the second input means 2000 may each communicate with each other. For example, the display device DD may provide an uplink signal ULS to the second input means 2000, and the second input means 2000 may provide a downlink signal DLS to the display device DD. In an embodiment, the uplink signal ULS may include information such as panel information, a protocol version, and the like, but is not particularly limited thereto. The downlink signal DLS may include a synchronization signal or state information of the second input means 2000. In an embodiment, the downlink signal DLS may include coordinate information of the second input means 2000, battery information of the second input means 2000, slope information of the second input means 2000, and/or various information stored in the second input means 2000, but is not particularly limited thereto.

In an embodiment, the display device DD may include the display panel 100, the input sensor 200, the panel driving circuit PDC, the sensor controller SCC, and the main controller MC.

The display panel 100 may be a component that may substantially display an image. In an embodiment, the display panel 100 may be a light emitting display layer. For example, the display panel 100 may be an organic light emitting display layer, a quantum dot display layer, a micro-LED display layer, a nano-LED display layer, or the like.

The input sensor 200 may be disposed on the display panel 100. The input sensor 200 may detect an external input provided by an input means. In an embodiment, the display device DD may detect at least one of the first input IP1 provided by the first input means 1000 and the second input IP2 provided by the second input means 2000.

The main controller MC may control overall operations of the display device DD. In an embodiment, the main controller MC may control operations of the panel driving circuit PDC and the sensor controller SCC. The main controller MC may include at least one microprocessor, and the main controller MC may be referred to as a "host". The main controller MC may further include a graphic controller.

The panel driving circuit PDC may drive the display panel 100. The panel driving circuit PDC may receive image data RGB and a driving control signal D-CS from the main controller MC. The driving control signal D-CS may include various signals. In an embodiment, the driving control signal D-CS may include a vertical synchronization signal, a horizontal synchronization signal, a clock signal, a data enable signal, and the like. The panel driving circuit PDC may generate signals to be provided to the display panel 100 based on the driving control signal D-CS.

The sensor controller SCC may exchange signals with the input sensor 200. The sensor controller SCC may receive a sensor control signal I-CS from the main controller MC. The sensor control signal I-CS may include a clock signal and a mode determination signal that may be used to determine a driving mode of the sensor controller SCC. The sensor controller SCC may operate in a first sensing mode, in which the sensor controller SCC may detect the first input IP1 provided by the first input means 1000, and in a second sensing mode, in which the sensor controller SCC may detect the second input IP2 provided by the second input means 2000, based on the sensor control signal I-CS.

The sensor controller SCC may calculate coordinate information of the first input IP1 or the second input IP2 based on the signal received from the input sensor 200, and may provide a coordinate signal I-SS corresponding to the coordinate information to the main controller MC. The main controller MC may execute an operation corresponding to an external input based on the coordinate signal I-SS. In an embodiment, the main controller MC may drive the panel driving circuit PDC such that an image of a new application may be displayed on the display panel 100.

Figure 4A:
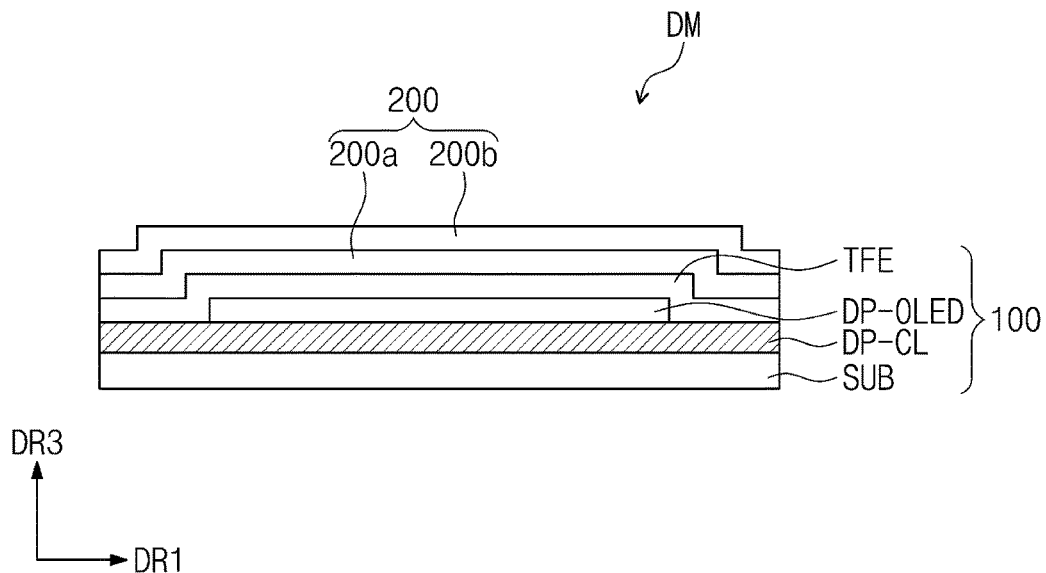
FIG. 4A is a cross-sectional view of a display module according to an embodiment of the inventive concept.

FIG. 4A is a cross-sectional view of the display module DM according to an embodiment of the inventive concept.

Referring to FIG. 4A, the display module DM may include the display panel 100 and the input sensor 200.

The display panel 100 may include a base layer SUB, a circuit layer DP-CL, a light emitting element layer DP-OLED, and an encapsulation layer TFE.

The base layer SUB may be a member that may provide a base surface on which the circuit layer DP-CL may be disposed. The base layer SUB may be a glass substrate, a metal substrate, a polymer substrate, or the like. However, embodiments of the inventive concept are not limited thereto, and the base layer SUB may be an inorganic layer, an organic layer, or a composite material layer.

The base layer SUB may have a multi-layer structure. In an embodiment, the base layer SUB may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be together referred to as a "base barrier layer".

Each of the first and second synthetic resin layers may include polyimide-based resin. In addition, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. In the specification, the term "(functional group)-based resin" indicates that a resin includes a material of the functional group.

The circuit layer DP-CL may be disposed on the base layer SUB. The circuit layer DP-CL may include an insulating layer, a semiconductor pattern, a conductive pattern, a signal line, and the like. The insulating layer, a semiconductor layer, and a conductive layer may be formed on the base layer SUB through a manner such as coating, evaporation, or the like. The insulating layer, the semiconductor layer, and the conductive layer may then be selectively patterned by a photolithography process, forming the semiconductor pattern, the conductive pattern, and the signal line included in the circuit layer DP-CL.

The light emitting element layer DP-OLED may be disposed on the circuit layer DP-CL. The light emitting element layer DP-OLED may include a light emitting element. For example, the light emitting element layer DP-OLED may include an organic light emitting material, a quantum dot, a quantum rod, a micro-LED, or a nano-LED.

The encapsulation layer TFE may be disposed on the light emitting element layer DP-OLED. The encapsulation layer TFE may protect the light emitting element layer DP-OLED from foreign objects such as moisture, oxygen, and dust particles.

The input sensor 200 may be disposed on the display panel 100. The input sensor 200 may detect an external input provided by an input means. The external input may be a user input. The user input may be provided via various input means, such as a portion of the user's body, light, heat, pens, pressure, or the like.

The input sensor 200 may include a first sensor 200a and a second sensor 200b. The first sensor 200a may be formed on the display panel 100 through successive processes. In an embodiment, the first sensor 200a may be directly disposed on the display panel 100. It will be understood that the expression "directly disposed" indicates here that a third component is not interposed between the first sensor 200a and the display panel 100. That is, in an embodiment, a separate adhesive member may not be interposed between the first sensor 200a and the display panel 100.

Alternatively, the first sensor 200a may be coupled to the display panel 100 by an adhesive member. The adhesive member may include a common adhesive, a common sticking agent, or the like.

The second sensor 200b may be disposed on the first sensor 200a. The second sensor 200b may be coupled to the first sensor 200a by an adhesive member. The adhesive member may include a common adhesive, a common sticking agent, or the like.

The display device DD may further include an anti-reflection layer and an optical layer, which may be disposed on the input sensor 200. The anti-reflection layer may reduce the reflectance of external light incident from outside of the display device DD. The optical layer may improve the front luminance of the display device DD by controlling a direction of light incident from the display panel 100.

Figure 4B:
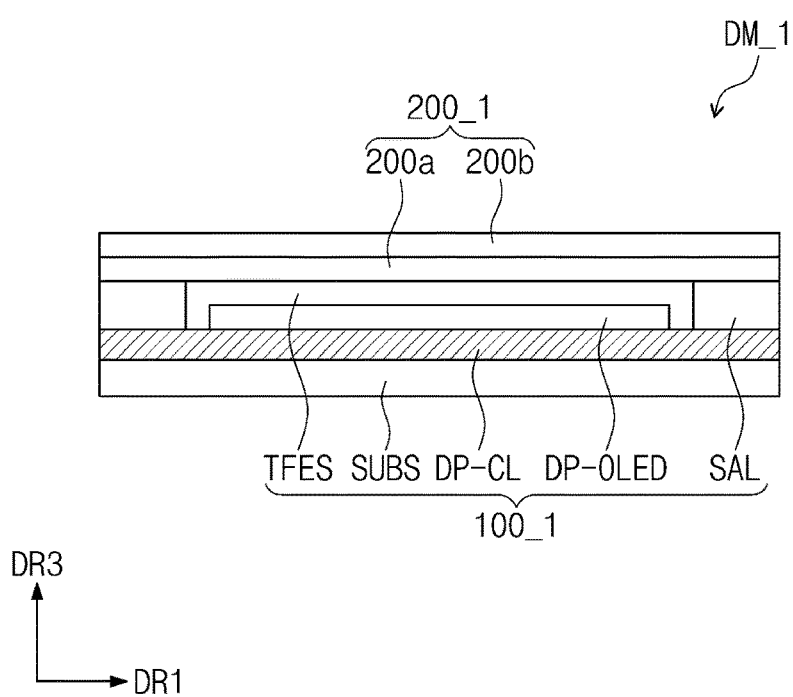
FIG. 4B is a cross-sectional view of a display module according to an embodiment of the inventive concept.

FIG. 4B is a cross-sectional view of a display module DM_1 according to an embodiment of the inventive concept. In an embodiment, a display device DD may include the display module DM_1 in place of a display module DM.

Referring to FIG. 4B, the display module DM_1 may include a display panel 100_1 and an input sensor 200_1. The display panel 100_1 may include a base substrate SUBS, a circuit layer DP-CL, a light emitting element layer DP-OLED, an encapsulation substrate TFES, and a coupling member SAL.

It will be understood that the base substrate SUBS, the circuit layer DP-CL, the light emitting element layer DP-OLED, and the input sensor 200_1 of FIG. 4B may be substantially the same as the base layer SUB, the circuit layer DP-CL, the light emitting element layer DP-OLED, and the input sensor 200 of the display module DM shown in FIG. 4A, and thus additional descriptions will be omitted to avoid redundancy.

Each of the base substrate SUBS and the encapsulation substrate TFES may be a glass substrate, a metal substrate, a polymer substrate, or the like, but is not particularly limited thereto.

The coupling member SAL may be interposed between the base substrate SUBS and the encapsulation substrate TFES. The coupling member SAL may couple the encapsulation substrate TFES to the base substrate SUBS or the circuit layer DP-CL. The coupling member SAL may include an inorganic material or an organic material. For example, the inorganic material may include a frit seal, and the organic material may include a photo-curable resin or a photo-plastic resin. However, the material constituting the coupling member SAL is not limited thereto.

In an embodiment, the input sensor 200_1 may be directly disposed on the encapsulation substrate TFES. It will be understood that the expression "directly disposed" indicates here that a third component is not interposed between the input sensor 200_1 and the encapsulation substrate TFES. That is, in an embodiment, a separate adhesive member may not be interposed between the input sensor 200_1 and the display panel 1001. However, embodiments of the inventive concept are not limited thereto, and an adhesive layer may be further interposed between the input sensor 200_1 and the encapsulation substrate TFES.

Figure 5:
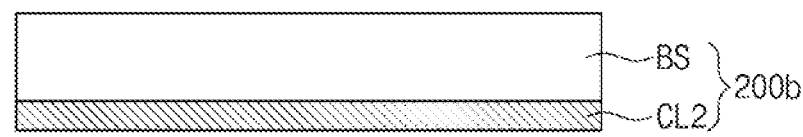
FIG. 5 is a cross-sectional view of a second sensor according to an embodiment of the inventive concept.
Figure 5:
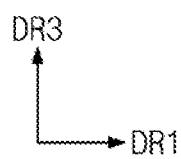

FIG. 5 is a cross-sectional view of the second sensor 200b according to an embodiment of the inventive concept.

Referring to FIG. 5, the second sensor 200b may include a base substrate BS and a second conductive layer CL2. The base substrate BS may include a flexible plastic material such as polyimide (PI), polyethylene terephthalate (PET), or the like.

The second conductive layer CL2 may be disposed under the base substrate BS. The second conductive layer CL2 may include a conductive material. The conductive material may be a transparent conductive material such as indium tin oxide (ITO), but the conductive material is not limited thereto. The second conductive layer CL2 may be a film type.

Figure 6:
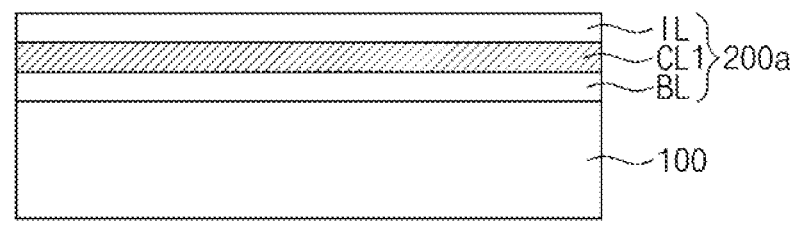
FIG. 6 is a cross-sectional view of a first sensor disposed on a display panel according to an embodiment of the inventive concept.
Figure 6:
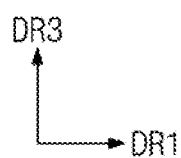

FIG. 6 is a cross-sectional view of the first sensor 200a disposed on the display panel 100 according to an embodiment of the inventive concept.

Referring to FIG. 6, the first sensor 200a may be formed on the display panel 100 through successive processes. In an embodiment, the first sensor 200a may be directly disposed on the display panel 100.

The first sensor 200a may include a base layer BL, a first conductive layer CL1, and a sensor insulating layer IL.

The base layer BL may be disposed on the display panel 100. The base layer BL may be an inorganic layer including at least one of silicon nitride, silicon oxynitride, and silicon oxide. Alternatively, the base layer BL may be an organic layer including at least one of an epoxy resin, an acrylate resin, and an imide-based resin. The base layer BL may have a single-layer structure or may have a multi-layer structure in which a plurality of base layers BL may be stacked in the third direction DR3.

The first conductive layer CL1 may be disposed on the base layer BL. The first conductive layer CL1 may include a conductive material.

The first conductive layer CL1 may have a single-layer structure or may have a multi-layer structure in which a plurality of first conductive layers CL1 may be stacked in the third direction DR3.

A first conductive layer CL1 may be a metal layer or a transparent conductive layer. A metal layer may include molybdenum, silver, titanium, copper, aluminum, or an alloy thereof. A transparent conductive layer may include a transparent conductive oxide such as indium tin oxide (ITO), indium zinc oxide (IZO), zinc oxide (ZnO), indium zinc tin oxide (IZTO), or the like. In addition, the transparent conductive layer may include a conductive polymer such as PEDOT, a metal nano wire, graphene, and/or the like.

A first conductive layer CL1 having a multi-layer structure may include metal layers. For example, the multi-layer structure may be a three-layer structure of titanium/aluminum/titanium layers. A conductive layer of the multi-layer structure may itself include at least one metal layer and at least one transparent conductive layer.

The sensor insulating layer IL may be disposed on the first conductive layer CL1. The sensor insulating layer IL may include at least one organic layer. The organic layer may include at least one of acrylate-based resin, methacrylate-based resin, polyisoprene-based resin, vinyl-based resin, epoxy-based resin, urethane-based resin, cellulose-based resin, siloxane-based resin, polyimide-based resin, polyamide-based resin, and perylene-based resin.

Figure 7:
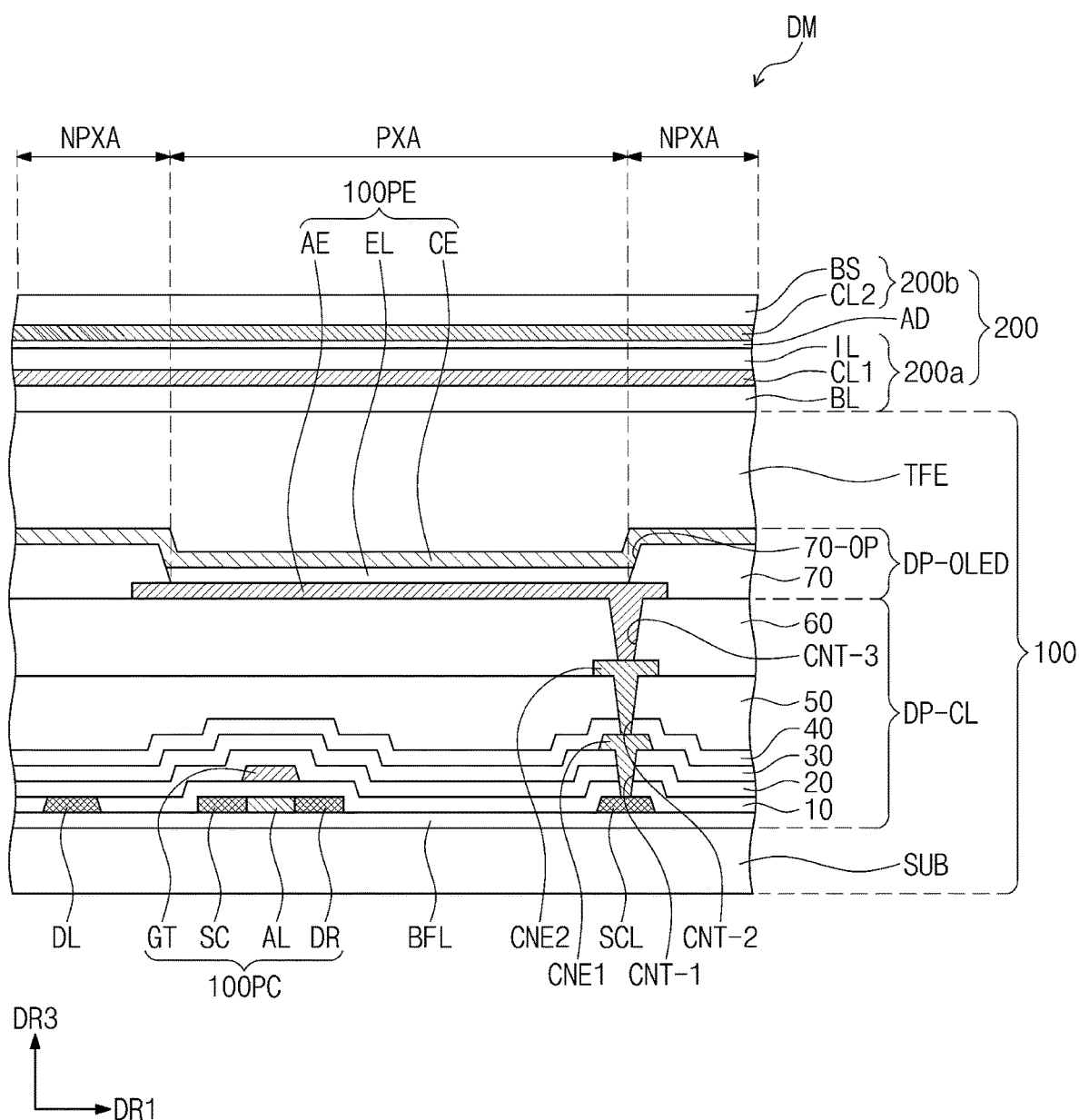
FIG. 7 is a cross-sectional view of a display module according to an embodiment of the inventive concept.

FIG. 7 is a cross-sectional view of the display module DM according to an embodiment of the inventive concept.

Referring to FIG. 7, at least one inorganic layer is formed on the upper surface of the base layer SUB. The inorganic layer may include at least one of aluminum oxide, titanium oxide, silicon oxide, silicon nitride, silicon oxynitride, zirconium oxide, and hafnium oxide. The inorganic layer may be formed as multi-layers. The multi-layered inorganic layers may constitute a barrier layer and/or a buffer layer. FIG. 7 illustrates an embodiment in which the display panel 100 includes a buffer layer BFL.

The buffer layer BFL may improve the bonding strength between the base layer SUB and a semiconductor pattern. The buffer layer BFL may include at least one of silicon oxide, silicon nitride, and silicon oxynitride. For example, the buffer layer BFL may include a structure in which a silicon oxide layer and a silicon nitride layer are alternately stacked.

The semiconductor pattern may be disposed on the buffer layer BFL. The semiconductor pattern may include polysilicon. However, the inventive concept is not limited thereto, and the semiconductor pattern may include amorphous silicon, low-temperature polycrystalline silicon, or an oxide semiconductor.

FIG. 7 only illustrates a portion of the semiconductor pattern, and the semiconductor pattern may be further disposed in another area. The semiconductor pattern may be arranged in a specific manner throughout pixels. The semiconductor pattern may have electrical characteristics that may differ depending on whether the semiconductor pattern is doped. The semiconductor pattern may include a first area having high conductivity and a second area having low conductivity. The first area may be doped with an N-type dopant or a P-type dopant. A P-type transistor may include a doping area doped with the P-type dopant, and an N-type transistor may include a doping area doped with the N-type dopant. The second area may be a non-doping area or an area doped with a dopant concentration which may be lower than a dopant concentration in the first area.

A conductivity of the first area may be greater than a conductivity of the second area. The first area may substantially operate as an electrode or a signal line. The second area may substantially correspond to a channel of a transistor. In other words, a part of the semiconductor pattern may be a channel of the transistor. Another part thereof may be a source or drain of the transistor. Another part may be a connection electrode or a connection signal line.

Figure 8:
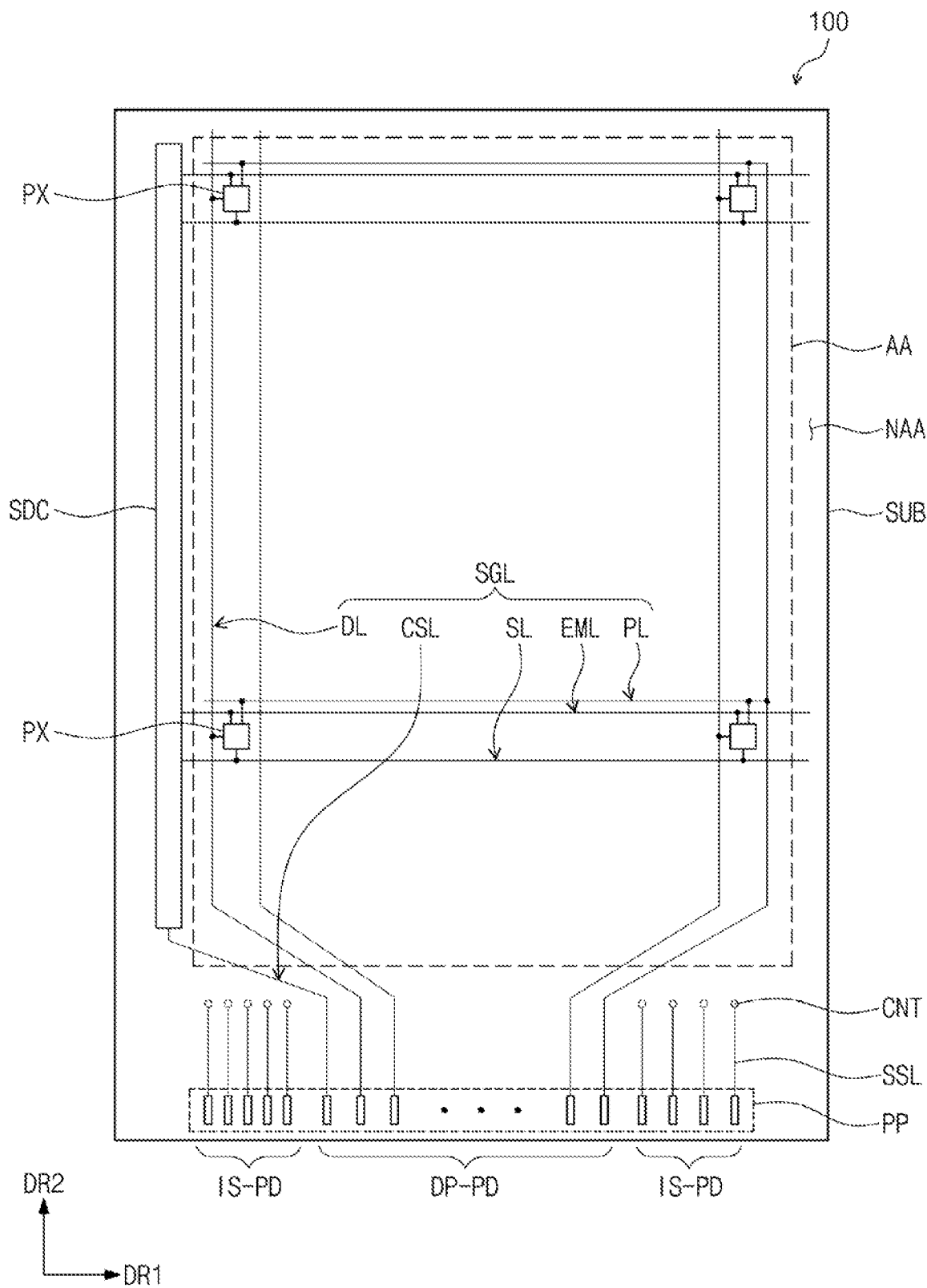
FIG. 8 is a plan view of a display panel according to an embodiment of the inventive concept.

The display panel 100 may include a plurality of pixels PX (refer to FIG. 8). For example, each of the pixels PX may include a plurality of transistors, a capacitor, and a light emitting element. FIG. 7 illustrates only one transistor 100PC among the plurality of transistors and a light emitting element 100PE that may be included in each of the pixels PX.

A source SC, a channel AL, and a drain DR of the transistor 100PC may be formed via a semiconductor pattern. The source SC and the drain DR may extend in directions opposite to each other from the channel AL. A portion of a connection signal wire SCL formed via a semiconductor pattern is illustrated in FIG. 7. The connection signal wire SCL may be connected to the drain DR of the transistor 100PC. Moreover, a portion of a data line DL formed from the semiconductor pattern is illustrated in FIG. 7. The data line DL may be connected to one of a drain and a source of a transistor.

A first insulating layer 10 may be disposed on the buffer layer BFL. The first insulating layer 10 may at least partially overlap a plurality of pixels in common and may at least partially cover the semiconductor pattern. The first insulating layer 10 may be an inorganic layer and/or an organic layer, and may have a single layer structure or a multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single-layered silicon oxide layer. An insulating layer of the circuit layer DP-CL may also be an inorganic layer and/or an organic layer, and may also have a single layer structure or a multi-layer structure. The inorganic layer may include at least one of the above-described materials, but is not limited thereto.

A gate GT of the transistor 100PC may be disposed on the first insulating layer 10. The gate GT may be a part of a metal pattern. The gate GT may overlap the channel AL. In a process of doping the semiconductor pattern, the gate GT may function as a mask.

A second insulating layer 20 may be disposed on the first insulating layer 10 and may cover the gate GT. The second insulating layer 20 may at least partially overlap pixels in common. The second insulating layer 20 may be an inorganic layer and/or an organic layer, and may have a single layer structure or a multi-layer structure. The second insulating layer 20 may include at least one of silicon oxide, silicon nitride, and silicon oxynitride. In an embodiment, the second insulating layer 20 may have a multi-layer structure including at least one of a silicon oxide layer and a silicon nitride layer.

A third insulating layer 30 may be disposed on the second insulating layer 20. The third insulating layer 30 may have a single layer structure or a multi-layer structure. For example, the third insulating layer 30 may have a multi-layer structure including at least one of a silicon oxide layer and a silicon nitride layer.

A first connection electrode CNE1 may be disposed on the third insulating layer 30. The first connection electrode CNE1 may be connected to the connection signal wire SCL through a contact hole CNT-1 penetrating the first, second, and third insulating layers 10, 20, and 30.

A fourth insulating layer 40 may be disposed on the third insulating layer 30. The fourth insulating layer 40 may be a silicon oxide layer having a single layer structure. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer DP-OLED may be disposed on the circuit layer DP-CL. The light emitting element layer DP-OLED may include the light emitting element 100PE. The light emitting element 100PE may include an organic light emitting material, a quantum dot, a micro-LED, or a nano-LED. However, embodiments of the inventive concept are not limited thereto. Hereinafter, the light emitting element 100PE is described as an organic light emitting device for convenience, but is not particularly limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 penetrating the sixth insulating layer 60.

A pixel defining film 70 may be disposed on the sixth insulating layer 60 and may at least partially cover the first electrode AE. An opening 70-OP may be provided on the pixel defining film 70. The opening 70-OP of the pixel defining film 70 may at least partially expose the first electrode AE.

The active area DA (refer to FIG. 1) may include a light emitting area PXA and a non-light emitting area NPXA adjacent to the light emitting area PXA. The non-light emitting area NPXA may surround the light emitting area PXA. In an embodiment, the light emitting area PXA may correspond to a partial area of the first electrode AE exposed by the opening 70-OP.

The light emitting layer EL may be disposed on the first electrode AE. The light emitting layer EL may be disposed in an area corresponding to the opening 70-OP. That is, the light emitting layer EL may be separately formed on each of pixels. When the light emitting layer EL is separately formed on each of the pixels, each of the light emitting layers EL may emit light of at least one color of blue, red, and green. However, the inventive concept is not limited thereto, and the light emitting layer EL may be connected and provided to each of the pixels in common. When the light emitting layer EL is connected and provided to each of the pixels in common, the light emitting layer EL may provide blue light or white light.

The second electrode CE may be disposed on the light emitting layer EL. The second electrode CE may be integrally disposed in a plurality of pixels in common.

A hole control layer may be interposed between the first electrode AE and the light emitting layer EL. The hole control layer may be disposed in the light emitting area PXA and the non-light emitting area NPXA in common. The hole control layer may include a hole transport layer and may further include a hole injection layer. An electron control layer may be interposed between the light emitting layer EL and the second electrode CE. The electron control layer may include an electron transport layer, and may further include an electron injection layer. The hole control layer and the electron control layer may be formed in common in a plurality of pixels via an open mask.

The encapsulation layer TFE may be disposed on the light emitting element layer DP-OLED. The encapsulation layer TFE may include sequentially stacked inorganic, organic, and inorganic layers, but the encapsulation layer TFE is not limited thereto.

The inorganic layers of the encapsulation layer TFE may protect the light emitting element layer DP-OLED from moisture and oxygen, and the organic layer of the encapsulation layer TFE may protect the light emitting element layer DP-OLED from foreign objects such as dust particles. The inorganic layers of the encapsulation layer TFE may include a silicon nitride layer, a silicon oxynitride layer, a silicon oxide layer, a titanium oxide layer, an aluminum oxide layer, or the like. The organic layer of the encapsulation layer TFE may include an acrylate-based organic layer, but is not limited thereto.

The input sensor 200 may include the first sensor 200a and the second sensor 200b. The first sensor 200a may include the base layer BL, the first conductive layer CL1, and the sensor insulating layer IL. The second sensor 200b may include the base substrate BS and the second conductive layer CL2.

The second conductive layer CL2 of the second sensor 200b and the sensor insulating layer IL of the first sensor 200a may be tightly coupled to each other by an adhesive layer AD. The first conductive layer CL1 may be insulated from the second conductive layer CL2 by the sensor insulating layer IL.

FIG. 8 is a plan view of the display panel 100 according to an embodiment of the inventive concept.

As illustrated in FIG. 8, the display panel 100 may include a scan driving circuit SDC, a plurality of signal lines SGL (hereinafter referred to as "signal lines"), the plurality of signal pads DP-PD and IS-PD (hereinafter referred to as "signal pads"), and a plurality of pixels PX (hereinafter referred to as "pixels") that may be formed on the base layer SUB.

The scan driving circuit SDC may generate a plurality of scan signals (hereinafter referred to as "scan signals") and sequentially output the scan signals to a plurality of scan lines SL (hereinafter referred to as "scan lines") to be described later. The scan driving circuit SDC may output not only the scan signals but also other control signals to the pixels PX.

The scan driving circuit SDC may include a plurality of transistors which may be formed through a same process in which transistors in the pixels PX may be formed.

The signal lines SGL may include the scan lines SL, the data lines DL, a power supply line PL, light emitting control lines EML, and a control signal line CSL. Each of the scan lines SL may be connected to a corresponding pixel PX among the pixels PX, each of the data lines DL may be connected to a corresponding pixel PX among the pixels PX, and each of the light emitting control lines EML may be connected to a corresponding pixel PX among the pixels PX. The power supply line PL may be connected in common with the pixels PX. The control signal line CSL may provide control signals to the scan driving circuit SDC. The power supply line PL may provide a voltage necessary for operations of the pixels PX. The power supply line PL may include a plurality of lines which may provide different voltages from each other.

In an embodiment, the signal lines SGL may further include auxiliary lines SSL. Each auxiliary line SSL refers to a signal line electrically connected to the input sensor 200 (refer to FIG. 9). In an embodiment of the inventive concept, the auxiliary lines SSL may be omitted. The auxiliary lines SSL may be connected to the contact holes CNT, respectively. The auxiliary lines SSL may be electrically connected to signal lines of the input sensor 200 (refer to FIG. 9) to be described later through the contact holes CNT.

The signal pads DP-PD and the signal pads IS-PD may include first-type signal pads DP-PD which may be connected to the data lines DL, the power supply line PL, and the control signal line CSL, and second-type signal pads IS-PD which may be connected to the auxiliary lines SSL. The first-type signal pads DP-PD and the second-type signal pads IS-PD may be disposed adjacent to each other in a pad area PP provided in a partial area of the peripheral area NAA. A stacked structure of the signal pads DP-PD might not be distinguished from a stacked structure of the signal pads IS-PD, and structure materials of the signal pads DP-PD might not distinguished from structure materials of the signal pads IS-PD. The signal pads DP-PD and the signal pads IS-PD may be formed through the same process as each other.

The active area AA may be provided as an area in which the pixels PX may be disposed. A plurality of electronic elements may be disposed in the active area AA. The electronic elements may include an organic light emitting diode which may be included in each of the pixels PX and a pixel driving circuit which may be connected to the organic light emitting diode. For example, the circuit layer DP-CL illustrated in FIG. 7 includes the scan driving circuit SDC, the signal lines SGL, the signal pads DP-PD and IS-PD, and the pixel driving circuit.

Each of the pixels PX may include a plurality of transistors, a capacitor, and an organic light emitting diode. The pixels PX may be electrically connected to the scan lines SL, the data lines DL, the light emitting control lines EML, and the power supply line PL, and may radiate light in response to signals received through the scan lines SL, the data lines DL, the light emitting control lines EML, and the power supply line PL.

The signal pads DP-PD and IS-PD of the display panel 100 may be electrically connected to the flexible circuit film FCB illustrated in FIG. 2.

A portion of the display panel 100 illustrated in FIG. 8 may be bent. A portion of the peripheral area NAA of the display panel 100 may be bent and may be bent around a bending axis parallel to the first direction DR1. The bending axis may overlap a portion of the control signal line CSL, a portion of the data lines DL, and a portion of the auxiliary lines SSL.

Figure 9:
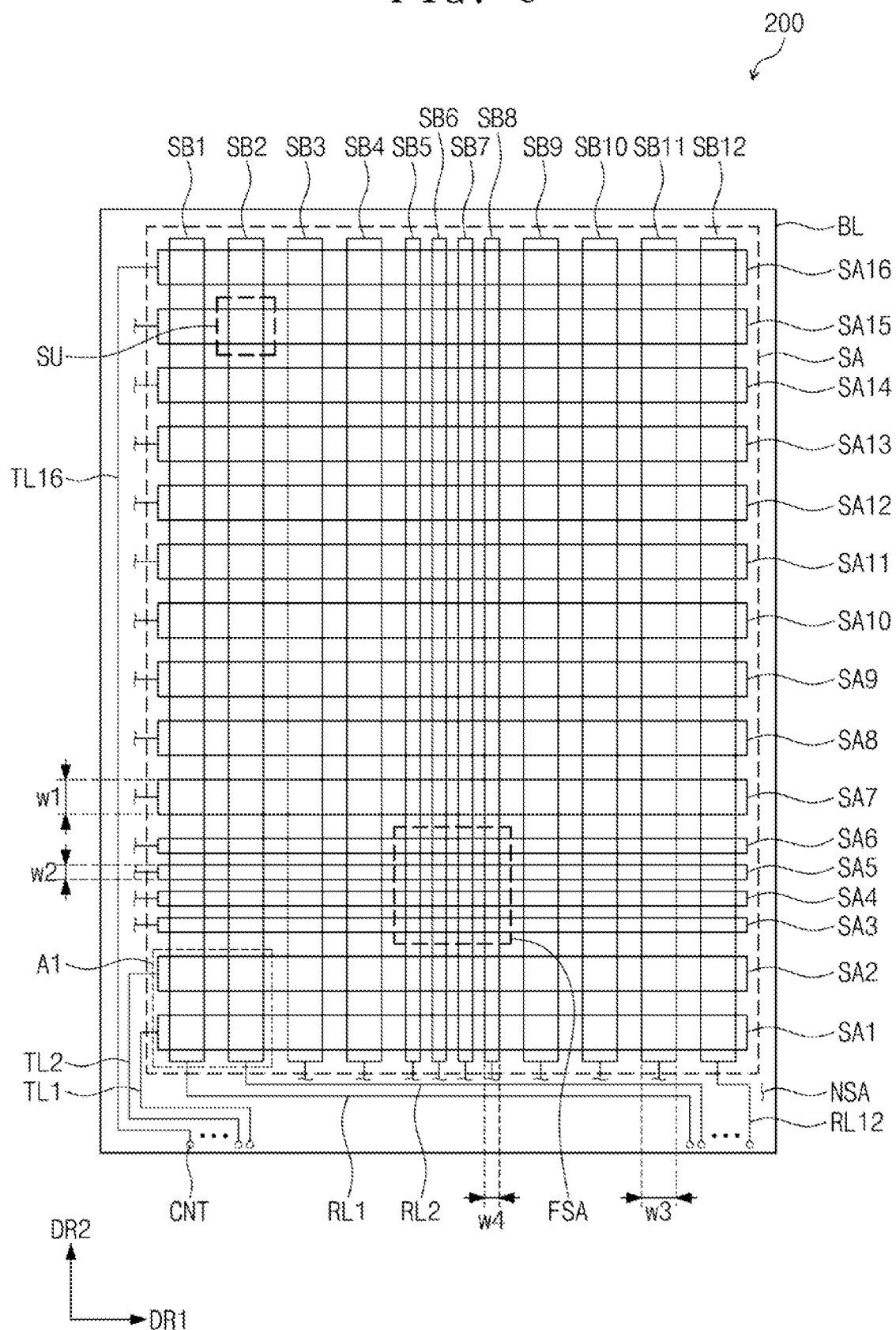
FIG. 9 is a plan view of an input sensor according to an embodiment of the inventive concept.

FIG. 9 is a plan view of the input sensor 200 according to an embodiment of the inventive concept.

Referring to FIG. 9, the input sensor 200 may include a sensing area SA and a non-sensing area NSA. The sensing area SA may be an area activated based on an electrical signal. For example, the sensing area SA may be an area in which an input may be sensed. The non-sensing area NSA may at least partially surround the sensing area SA. The sensing area SA may correspond to the active area AA of FIG. 8, and the non-sensing area NSA may correspond to the peripheral area NAA of FIG. 8.

The input sensor 200 may include first sensing electrodes SA1 to SA16 and second sensing electrodes SB1 to SB12. The first sensing electrodes SA1 to SA16 may be formed by the first conductive layer CL1 formed on the base layer BL shown in FIG. 7. The second sensing electrodes SB1 to SB12 may be formed by the second conductive layer CL2 shown in FIG. 7 and may be insulated from the first sensing electrodes SA1 to SA16. However, the inventive concept is not limited thereto. In an embodiment, the first sensing electrodes SA1 to SA16 may be formed by the second conductive layer CL2. The second sensing electrodes SB1 to SB12 may be formed by the first conductive layer CL1.

The first sensing electrodes SA1 to SA16 and the second sensing electrodes SB1 to SB12 may be disposed in the sensing area SA. The first sensing electrodes SA1 to SA16 and the second sensing electrodes SB1 to SB12 may be electrically insulated from each other and may cross each other in the sensing area SA.

The first sensing electrodes SA1 to SA16 may extend in the first direction DR1 and may be arranged in the second direction DR2. The second sensing electrodes SB1 to SB12 may extend in the second direction DR2 and may be arranged in the first direction DR1.

In an embodiment of the inventive concept, the input sensor 200 may include the first sensing electrodes SA1 to SA16 and the second sensing electrodes SB1 to SB12, but the inventive concept is not limited thereto. The number of first sensing electrodes and the number of second sensing electrodes may be variously changed. For example, FIG. 9 illustrates that the input sensor 200 includes more first sensing electrodes than second sensing electrodes. However, in an embodiment, the input sensor 200 may include an equal amount of second sensing electrodes as first sensing electrodes, or may include more second sensing electrodes than first sensing electrodes.

The input sensor 200 may obtain location information about an external input through a change in mutual capacitance between the first sensing electrodes SA1 to SA16 and the second sensing electrodes SB1 to SB12.

The input sensor 200 may further include first to sixteenth transmission lines TL1 to TL16 and first to twelfth reception lines RL1 to RL12. The first to sixteenth transmission lines TL1 to TL16 and the first to twelfth reception lines RL1 to RL12 may be disposed in the non-sensing area NSA. The first to sixteenth transmission lines TL1 to TL16 may be electrically connected to the first sensing electrodes SA1 to SA16, respectively. The first to twelfth reception lines RL1 to RL12 may be electrically connected to the second sensing electrodes SB1 to SB12, respectively. However, the inventive concept is not limited thereto. In an embodiment of the inventive concept, the input sensor 200 may further include reception lines which may also be electrically connected to the second sensing electrodes SB1 to SB12, respectively.

An area in which a first sensing electrode crosses a second sensing electrode may be referred to as a sensing unit SU.

The first to sixteenth transmission lines TL1 to TL16 and the first to twelfth reception lines RL1 to RL12 may be electrically connected to the auxiliary lines SSL illustrated in FIG. 8 through the contact hole CNT.

In an embodiment, the first sensing electrodes SA1, SA2, and SA7 to SA14, may be included in a first group of the first sensing electrodes, and the first sensing electrodes SA3 to SA6 may be included in a second group of the first sensing electrodes. A wire width w2 of each of the first sensing electrodes SA3 to SA6 of the second group of the first sensing electrodes may be smaller than a wire width w1 of each of the first sensing electrodes SA1, SA2, and SA7 to SA14 of the first group of the first sensing electrodes. In an embodiment, the wire width w2 of each of the first sensing electrodes SA3 to SA6 of the second group of the first sensing electrodes may be 80 micrometers (μm) or less.

In an embodiment, the second sensing electrodes SB1 to SB4 and SB9 to SB12 may be included in a first group of the second sensing electrodes, and the second sensing electrodes SB5 to SB8 may be included in a second group of the second sensing electrodes. A wire width w4 of each of the second sensing electrodes SB5 to SB8 of the second group of the second sensing electrodes may be smaller than a wire width w3 of each of the second sensing electrodes SB1 to SB4 and SB9 to SB12 of the first group of the second sensing electrodes. The wire width w4 of each of the second sensing electrodes SB5 to SB8 of the second group of the second sensing electrodes may be 80 micrometers (μm) or less.

The first sensing electrodes SA3 to SA6 of the second group of the first sensing electrodes may cross the second sensing electrodes SB5 to SB8 of the second group of the second sensing electrodes in a fingerprint sensing area FSA. The fingerprint sensing area FSA may have a higher precision of detection of the first input IP1 provided by the first input means 1000 (refer to FIG. 1) and the second input IP2 provided by the second input means 2000 (refer to FIG. 1) than the remaining sensing area SA. Accordingly, the fingerprint sensing area FSA may be an area in which a user's fingerprint or a detailed input by a pen may be detected. For convenience of description, an area in which the first sensing electrodes SA3 to SA6 of the second group of the first sensing electrodes cross the second sensing electrodes SB5 to SB8 of the second group of the second sensing electrodes is referred to as the fingerprint sensing area FSA. However, the fingerprint sensing area FSA may not only be an area in which a fingerprint may be detected, but may also be an area having higher detection precision than the remaining sensing area SA. The fingerprint sensing area FSA may detect various inputs such as a touch, a pen contact, and a fingerprint. In addition, the fingerprint sensing area FSA shown in FIG. 9 is positioned at a lower center of the display device DD, but the inventive concept is not limited thereto.

Figure 10:
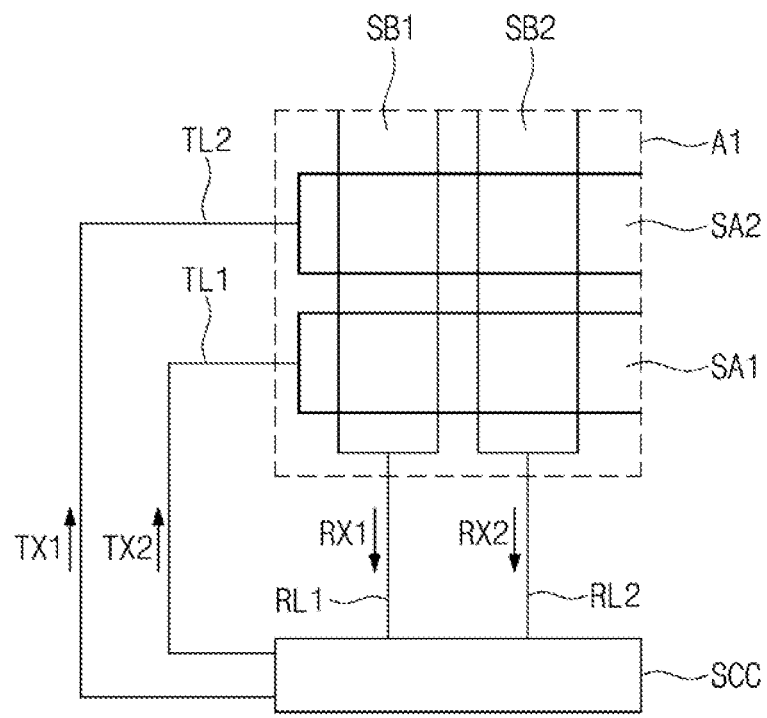
FIG. 10 is a diagram illustrating an operation of an input sensor.

FIG. 10 is a diagram illustrating an operation of an input sensor.

Referring to FIGS. 9 and 10, each of the first sensing electrodes SA1 to SA16 may operate as a transmission electrode. Each of the second sensing electrodes SB1 to SB12 may operate as a reception electrode. The sensor controller SCC may detect an external input by detecting an amount of change in mutual capacitance formed between the first sensing electrodes SA1 to SA16 and the second sensing electrodes SB1 to SB12.

For convenience of description, FIG. 10 illustrates only the first sensing electrodes SA1 and SA2 from among the first sensing electrodes SA1 to SA16 illustrated in FIG. 9 and the second sensing electrodes SB1 and SB2 from among the second sensing electrodes SB1 to SB12 illustrated in FIG. 9. The first sensing electrodes SA3 to SA16 and the second sensing electrodes SB3 to SB12 that are illustrated in FIG. 9 may also be driven in the same scheme as the first sensing electrodes SA1 and SA2 and the second sensing electrodes SB1 and SB2 described with reference to FIG. 10.

The sensor controller SCC may provide transmit signals TX1 and TX2 to the first sensing electrodes SA1 and SA2, respectively. The sensor controller SCC may receive sensing signals RX1 and RX2 from second sensing electrodes SB1 and SB2, respectively. Accordingly, the sensor controller SCC may compare the transmit signals TX1 and TX2 with the sensing signals RX1 and RX2 corresponding to the transmit signals TX1 and TX2, respectively, and then may generate a coordinate value of a location at which the external input is provided based on the amount of change in the sensing signals RX1 and RX2.

Figure 11:
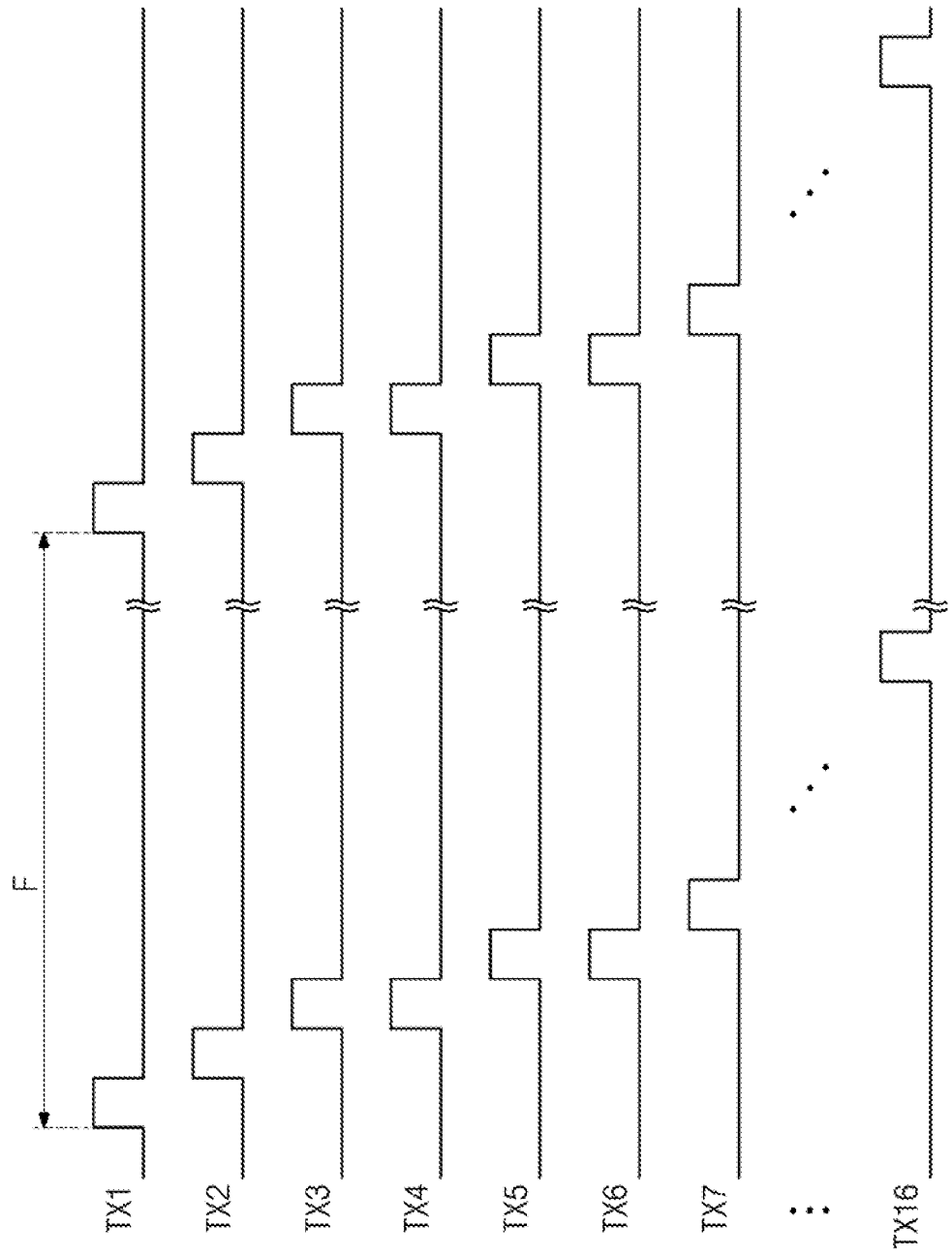
FIG. 11 is a timing diagram of an operation of an input sensor in a first operating mode.

FIG. 11 is a timing diagram of transmit signals TX1 to TX16 provided to an input sensor 200 (refer to FIG. 9) in a first operating mode.

Referring to FIGS. 3, 9, and 11, in a first operating mode, the display device DD may detect the first input IP1 provided by the first input means 1000 and/or the second input IP2 provided by the second input means 2000 via the entire sensing area SA.

In the first operating mode, the sensor controller SCC may provide transmit signals TX1 to TX16 to the first sensing electrodes SA1 to SA16, respectively. The sensor controller SCC may receive sensing signals RX1 to RX12 from second sensing electrodes SB1 to SB12, respectively.

In the first operating mode, the sensor controller SCC may sequentially provide transmit signals TX1 to TX16 of an active level (e.g., a high level) to the first sensing electrodes SA1 to SA16 during a frame F; at least one of the first sensing electrodes SA3 to SA6 of the second group of the first sensing electrodes may provide the same transmit signals to at least two of the first sensing electrodes.

During the frame F in the first operating mode, active periods of the transmit signals TX1, TX2, and TX7 to TX14 provided to the first sensing electrodes SA1, SA2, and SA7 to SA14 of the first group may not overlap each other.

In the first operating mode, the sensor controller SCC may provide the first sensing electrodes SA3 and SA4 of the second group with transmit signals TX3 and TX4 having a same waveform as each other. The sensor controller SCC may provide the first sensing electrodes SA5 and SA6 of the second group with the transmit signals TX5 and TX6 having a same waveform as each other. In other words, active periods of the transmit signals TX3 and TX4 overlap each other, and active periods of the transmit signals TX5 and TX6 overlap each other.

In an embodiment, in the first operating mode, the sensor controller SCC may provide transmit signals TX3 to TX6 having a same waveform to each other to all of the first sensing electrodes SA3 to SA6 of the second group of the first sensing electrodes.

FIG. 12 is a timing diagram of an operation of an input sensor in a second operating mode.

Referring to FIGS. 3, 9, and 12, in a second operating mode, the display device DD may detect the first input IP1 provided by the first input means 1000 and/or the second input IP2 provided by the second input means 2000 via the fingerprint sensing area FSA disposed in the sensing area SA.

In the second operating mode, the sensor controller SCC may provide transmit signals TX3 to TX6 to the first sensing electrodes SA3 to SA6 of the second group of the first sensing electrodes, respectively. The sensor controller SCC may receive sensing signals RX5 to RX8 from the second sensing electrodes SB5 to SB8 of the second group of the second sensing electrodes, respectively.

In the second operating mode, the sensor controller SCC may sequentially provide transmit signals TX3 to TX6 of an active level (e.g., a high level) to the first sensing electrodes SA3 to SA6 of the second group of the first sensing electrodes during a frame F. In other words, active periods of transmit signals TX3 to TX6 do not overlap each other. During the frame F, the transmit signals TX1, TX2, and TX7 to TX14 provided to the first sensing electrodes SA1, SA2, and SA7 to SA14 of the first group of the first sensing electrodes may be maintained at an inactive level (e.g., a low level).

According to an embodiment of the inventive concept, a display device may include a first sensing electrode disposed on a first sensing layer and a second sensing electrode disposed on a second sensing layer. In particular, the second sensing layer may be formed via a process independent of a process for forming a display panel, and may be disposed on the first sensing layer.

According to an embodiment of the inventive concept, a display device may more accurately detect external inputs such as a user's fingerprint, an electronic pen contact, or the like by including first sensing electrodes and second sensing electrodes in a second sensing area of the display device having smaller wire widths than first sensing electrodes and second sensing electrodes in a first sensing area the display device.

While the inventive concept has been shown and described with reference to embodiments thereof, it will be apparent to those of ordinary skill in the art that various changes and modifications may be made thereto without departing from the spirit and scope of the inventive concept as set forth in the following claims.

What is claimed is:

1. A display device comprising:
   a display panel;
   a plurality of first sensing electrodes disposed on the display panel, the plurality of first sensing electrodes including a first group of sensing electrodes and a second group of sensing electrodes;
   a plurality of second sensing electrodes disposed on the first sensing electrodes and isolated from the first sensing electrodes, the plurality of second sensing electrodes including a third group of sensing electrodes and a fourth group of second sensing electrodes; and
   a sensor controller configured to provide a transmit signal of an active level to each of the plurality of first sensing electrodes in a first sensing mode, wherein active periods of transmit signals provided to the first sensing electrodes of the first group in the first sensing mode do not overlap each other,
   wherein a wire width of each first sensing electrode of the second group is smaller than a wire width of each first sensing electrode of the first group,
   wherein a wire width of each second sensing electrode of the fourth group is smaller than a wire width of each second sensing electrode of the third group,
   wherein a first portion of each first sensing electrode of the second group and a first portion of each second sensing electrode of the fourth group is disposed in a fingerprint sensing area and a second portion of each first sensing electrode of the second group and a second portion of each second sensing electrode of the fourth group is disposed in a non-fingerprint sensing area, wherein the sensor controller sequentially provides transmit signals of an active level to the first sensing electrodes of the second group in a second sensing mode, wherein the sensor controller maintains the transmit signals provided to the first sensing electrodes of the first group at an inactive level in the second sensing mode, wherein, in the first sensing mode, first active periods of the transmit signals provided to a first electrode and a second electrode among the first sensing electrodes of the second group overlap each other, second active periods of the transmit signals provided to a third electrode and a fourth electrode among the first sensing electrodes of the second group overlap each other, and the first active periods and the second active periods do not overlap, and wherein, in the first sensing mode, the active periods of transmit signals provided to the first sensing electrodes of the first group and the first active periods and the second active periods do not overlap each other.

2. The display device of claim 1, wherein the plurality of first sensing electrodes extend in a first direction, wherein the plurality of second sensing electrodes extend in a second direction crossing the first direction, and wherein an area in which the first sensing electrodes of the second group cross the second sensing electrodes of the fourth group is the fingerprint sensing area.

3. The display device of claim 1, further comprising:
a panel driving circuit configured to drive the display panel and to output a synchronization signal; and
wherein the sensor controller is further configured to transmit or receive a signal to or from the plurality of first sensing electrodes and the plurality of second sensing electrodes.

4. The display device of claim 1, wherein the active periods of the transmit signals provided to the first sensing electrodes of the first group in the first sensing mode do not overlap the active periods of the transmit signals provided to the first sensing electrodes of the second group in the first sensing mode.

5. The display device of claim 1, wherein the second sensing mode is a mode in which a user's fingerprint is detected.

6. The display device of claim 1, further comprising:
a base layer disposed on the display panel;
a first conductive layer disposed on the base layer;
a sensor insulating layer disposed on the first conductive layer;
a base substrate; and
a second conductive layer disposed under the base substrate,
wherein the plurality of first sensing electrodes are formed by the first conductive layer, and the plurality of second sensing electrodes are formed by the second conductive layer.

7. The display device of claim 6, further comprising:
an adhesive layer configured to bond the sensor insulating layer and the second conductive layer.

8. The display device of claim 1, wherein the wire width of each of the first sensing electrodes of the second group is not greater than 80 micrometers ($\mu m$).

9. The display device of claim 1, wherein the display panel includes:
a plurality of pixels connected to a plurality of scan lines and a plurality of data lines; and
a scan driving circuit connected to the plurality of scan lines.

10. A display device comprising:
a display panel;
a base layer disposed on the display panel;
a first conductive layer disposed on the base layer;
a plurality of first sensing electrodes formed by the first conductive layer, the plurality of first sensing electrodes including a first group of first sensing electrodes and a second group of first sensing electrodes;
a sensor insulating layer disposed on the first conductive layer;
a base substrate;
a second conductive layer disposed under the base substrate;
a plurality of second sensing electrodes formed by the second conductive layer, the plurality of second sensing electrodes including a third group of second sensing electrodes and a fourth group of second sensing electrodes;
an adhesive layer configured to bond the sensor insulating layer and the second conductive layer; and
a sensor controller configured to provide a transmit signal of an active level to each of a plurality of first sensing electrodes in a first sensing mode, wherein active periods of transmit signals provided to the first sensing electrodes of the first group in the first sensing mode do not overlap each other, wherein the plurality of first sensing electrodes is formed by the first conductive layer, and a plurality of second sensing electrodes is formed by the second conductive layer, wherein a first portion of each first sensing electrode of the second group and a first portion of each second sensing electrode of the fourth group is disposed in a fingerprint sensing area and a second portion of each first sensing electrode of the second group and a second portion of each second sensing electrode of the fourth group is disposed in a non-fingerprint sensing area, wherein the sensor controller sequentially provides transmit signals of an active level to the first sensing electrodes of the second group in a second sensing mode, wherein the sensor controller maintains the transmit signals provided to the first sensing electrodes of the first group at an inactive level in the second sensing mode, wherein, in the first sensing mode, first active periods of the transmit signals provided to a first electrode and a second electrode among the first sensing electrodes of the second group overlap each other, second active periods of the transmit signals provided to a third electrode and a fourth electrode among the first sensing electrodes of the second group overlap each other, and the first active periods and the second active periods do not overlap, and wherein, in the first sensing mode, the active periods of transmit signals provided to the first sensing electrodes of the first group and the first active periods and the second active periods do not overlap each other.

11. The display device of claim 10, wherein a wire width of each first sensing electrode of the second group is smaller than a wire width of each first sensing electrode of the first group.

12. The display device of claim 10, wherein a wire width of each second sensing electrode of the fourth group is smaller than a wire width of each second sensing electrode of the third group.

13. The display device of claim 10, wherein the plurality of first sensing electrodes extend in a first direction, wherein the plurality of second sensing electrodes extend in a second direction crossing the first direction, and wherein an area in which the first sensing electrodes of the second group cross the second sensing electrodes of the fourth group is the fingerprint sensing area.

14. The display device of claim 10, further comprising:

a panel driving circuit configured to drive the display panel and to output a synchronization signal; and wherein the sensor controller is further configured to transmit or receive a signal to or from the plurality of first sensing electrodes and the plurality of second sensing electrodes.

15. The display device of claim 10, wherein the active periods of the transmit signals provided to the first sensing electrodes of the first group in the first sensing mode do not overlap the active periods of the transmit signals provided to the first sensing electrodes of the second group in the first sensing mode.

16. The display device of claim 10, wherein the second sensing mode is a mode in which a user's fingerprint is detected.

17. The display device of claim 1, wherein an active period of a transmit signal provided to a sensing electrode of the first group precedes the first active periods.

18. The display device of claim 1, wherein an active period of a transmit signal provided to a sensing electrode of the first group follows the second active periods.

19. The display device of claim 10, wherein an active period of a transmit signal provided to a sensing electrode of the first group precedes the first active periods.

20. The display device of claim 10, wherein an active period of a transmit signal provided to a sensing electrode of the first group follows the second active periods.

* * * * *